(12) United States Patent
Baek et al.

(10) Patent No.: US 9,561,579 B1
(45) Date of Patent: Feb. 7, 2017

(54) FLEXIBLE SOLID ELECTROLYTE, ALL-SOLID-STATE LITHIUM BATTERY INCLUDING THE FLEXIBLE SOLID ELECTROLYTE, AND METHOD OF PREPARING THE FLEXIBLE SOLID ELECTROLYTE

(71) Applicant: Samsung Electronics Co., Ltd., Suwon-si, Gyeonggi do (KR)

(72) Inventors: Seung-wook Baek, Hwaseong-si (KR); Tae-young Kim, Seoul (KR); Young-sin Park, Suwon-si (KR); Jae-myung Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/259,605

(22) Filed: Sep. 8, 2016

Related U.S. Application Data

(62) Division of application No. 14/082,437, filed on Nov. 18, 2013, now abandoned.

(30) Foreign Application Priority Data

Dec. 14, 2012 (KR) ..................... 10-2012-00146623

(51) Int. Cl.
| | |
|---|---|
| *H01M 10/056* | (2010.01) |
| *B24C 1/08* | (2006.01) |
| *B24C 11/00* | (2006.01) |
| *H01M 10/052* | (2010.01) |

(52) U.S. Cl.
CPC .............. *B24C 1/083* (2013.01); *B24C 1/086* (2013.01); *B24C 11/00* (2013.01); *H01M 10/052* (2013.01); *H01M 10/056* (2013.01)

(58) Field of Classification Search
None
See application file for complete search history.

(56) References Cited

U.S. PATENT DOCUMENTS

| | | |
|---|---|---|
| 2007/0015060 A1 | 1/2007 | Klaassen |
| 2012/0039824 A1 | 2/2012 | Archer et al. |

FOREIGN PATENT DOCUMENTS

| | | |
|---|---|---|
| JP | 2006086102 A | 3/2006 |
| JP | 2008112661 A | 5/2008 |
| JP | 2010192258 A | 9/2010 |
| JP | 2010257803 A | 11/2010 |
| KR | 1020040102653 A | 12/2004 |
| KR | 1020060091648 A | 8/2006 |
| KR | 1020070003441 A | 1/2007 |
| KR | 101146191 B1 | 7/2010 |

OTHER PUBLICATIONS

Search Report dated Jun. 8, 2012.

*Primary Examiner* — Patrick Ryan
*Assistant Examiner* — Wyatt McConnell
(74) *Attorney, Agent, or Firm* — Cantor Colburn LLP

(57) ABSTRACT

A flexible solid electrolyte includes a first inorganic protective layer, an inorganic-organic composite electrolyte layer including an inorganic component and an organic component, and a second inorganic protective layer, where the inorganic-organic composite electrolyte layer is disposed between the first inorganic protective layer and the second inorganic protective layer, and the inorganic component and the organic component collectively form a continuous ion conducting path.

11 Claims, 5 Drawing Sheets

FLEXIBLE SOLID ELECTROLYTE, ALL-SOLID-STATE LITHIUM BATTERY INCLUDING THE FLEXIBLE SOLID ELECTROLYTE, AND METHOD OF PREPARING THE FLEXIBLE SOLID ELECTROLYTE

CROSS-REFERENCE TO RELATED APPLICATIONS

This application is a divisional of U.S. patent application Ser. No. 14/082,437, filed on Nov. 18, 2013, which claims priority to Korean Patent Application No. 10-2012-0146623, filed on Dec. 14, 2012, and all the benefits accruing therefrom under 35 U.S.C. §119, the content of which in its entirety is herein incorporated by reference.

BACKGROUND

1. Field

Embodiments of the invention relate to a flexible solid electrolyte, an all-solid-state lithium battery including the flexible solid electrolyte, and a method of preparing the flexible solid electrolyte.

2. Description of the Related Art

Lithium batteries typically have high voltage and high energy densities, and thus are used in various applications. Devices such as electric vehicles, e.g., a hybrid electric vehicle ("HEV"), plug-in hybrid electric vehicle ("PHEV") and the like, are desired to be operable at high temperatures, to charge or discharge a large quantity of electricity, and to have long-term usability, such that such devices use lithium batteries having high-discharge capacities and better lifetime characteristics.

A lithium battery using liquid electrolyte including a lithium salt dissolved in an organic solvent may be chemically unstable when using an electrode operating at a high voltage of about 5 volts (V) or greater. In such a lithium battery, the liquid electrolyte may begin to decompose at a voltage of about 2.5 V or greater, and a leakage may occur such that a risk of fire or explosion may be high. Growth potential of dendrite from the liquid electrolyte may lead to self-discharge or overheating of the lithium battery.

All-solid-state liquid batteries using a solid electrolyte as a lithium ion conductor are considered relatively stable compared to lithium batteries using liquid electrolytes. Unlike lithium batteries using liquid electrolytes, all-solid-state lithium batteries have no leakage concerns, and thus may be very safe and have high stability. However, electrolyte materials for the all-solid-state lithium batteries are inherently brittle and not flexible such that the solid electrolyte may decompose when used along with a lithium anode or a high-voltage electrode, and ionic conductivity of the solid electrolyte may be low due to a high grain boundary resistance.

SUMMARY

Provided are embodiments of a flexible solid electrolyte with high electrochemical stability, high ionic conductivity, and flexible characteristics.

Provided is an embodiment of an all-solid-state lithium battery including the flexible solid electrolyte.

Provided is an embodiment of a method of preparing the flexible solid electrolyte.

Additional aspects will be set forth in part in the description which follows and, in part, will be apparent from the description, or may be learned by practice of the embodiments described herein.

According to an embodiment of the invention, a flexible solid electrolyte includes a first inorganic protective layer, an inorganic-organic composite electrolyte layer including an inorganic component and an organic component, and a second inorganic protective layer, where the inorganic-organic composite electrolyte layer is disposed between the first inorganic protective layer and the second inorganic protective layer, and the inorganic component and the organic component collectively form a continuous ion conducting path.

According to another embodiment of the invention, an all-solid-state lithium battery includes: a cathode; an anode; and a flexible solid electrolyte disposed between the cathode and the anode, where the flexible solid electrolyte includes: a first inorganic protective layer; an inorganic-organic composite electrolyte layer including an inorganic component and an organic component; and a second inorganic protective layer, where the inorganic-organic composite electrolyte layer is disposed between the first inorganic protective layer and the second inorganic protective layer, and the inorganic component and the organic component collectively form a continuous ion conducting path.

According to another embodiment of the invention, a method of preparing a flexible solid electrolyte includes: spraying a first inorganic protective layer forming material on a cathode to form a first inorganic protective layer; spraying an inorganic-organic composite electrolyte layer forming material on the first inorganic protective layer to form an inorganic-organic composite electrolyte layer; and spraying a second inorganic protective layer forming material on the inorganic-organic composite electrolyte layer to form a second inorganic protective layer.

BRIEF DESCRIPTION OF THE DRAWINGS

These and/or other features of this disclosure will become more apparent by describing in further detail exemplary embodiments thereof with reference to the accompanying drawings, in which.

DETAILED DESCRIPTION

Figure 1:
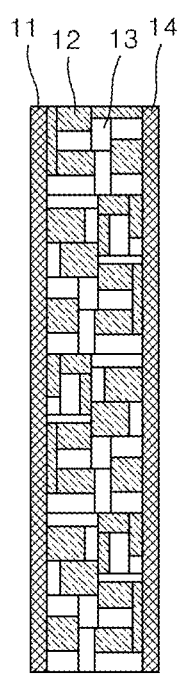
FIG. 1 is a cross-sectional view of an embodiment of a flexible solid electrolyte.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

According to an embodiment of the invention, a flexible solid electrolyte includes an inorganic-organic composite electrolyte layer protected by an inorganic protective layer.

In such an embodiment, the flexible solid electrolyte may have high electrochemical stability, ionic conductivity and flexibility, and thus may be employed in, for example, a flexible all-solid-state lithium battery.

FIG. 1 is a cross-sectional view of an embodiment of a flexible solid electrolyte. Referring to FIG. 1, an embodiment of the flexible solid electrolyte includes a first inorganic protective layer 11, an inorganic-organic composite electrolyte layer including an inorganic component, e.g., an inorganic electrolyte 12, and an organic component, e.g., an organic electrolyte 13, and a second inorganic protective layer 14. In such an embodiment, the first inorganic protective layer 11, the inorganic-organic composite electrolyte layer and the second inorganic protective layer 14 are sequentially stacked on one another.

Figure 2:
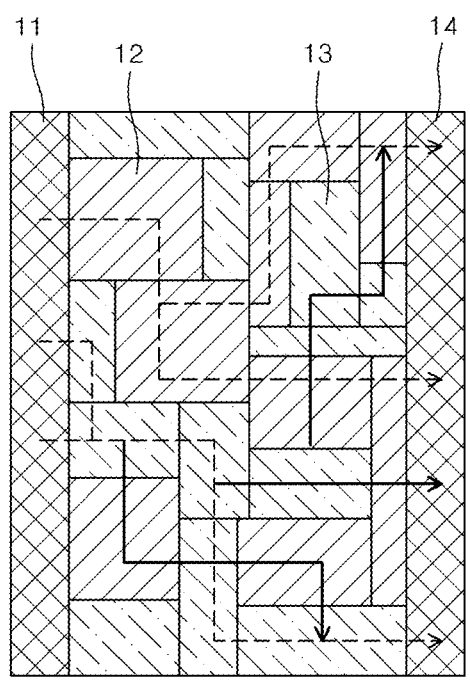
FIG. 2 is a partial enlarged view of the flexible solid electrolyte of FIG. 1.

FIG. 2 is a partial enlarged view of the flexible solid electrolyte of FIG. 1, illustrating that the inorganic-organic composite electrolyte layer, which is disposed between and protected by the first and second inorganic protective layers 11 and 14, may function as an ion conducting path. Referring to FIG. 2, the inorganic component in the inorganic-organic composite electrolyte layer (e.g., the inorganic electrolyte 12) and the organic component in the inorganic-organic composite electrolyte layer (e.g., the organic electrolyte 13) collectively form continuous ion conducting paths such that ionic conductivity is substantially improved. In such an embodiment, the organic component in the inorganic-organic composite electrolyte layer, e.g., the organic electrolyte 13, may allow the flexible solid electrolyte to be ductile.

Each of the first inorganic protective layer 11 and the second inorganic protective layer 14 may include a film that protects the inorganic-organic composite electrolyte layer, and may increase durability of the flexible solid electrolyte against a higher driving voltage of a lithium battery. The first inorganic protective film 11 and the second inorganic protective layer 14 may include substantially the same material as each other or different materials from each other. In an embodiment, the first inorganic protective layer 11 and the second inorganic protective layer 14 may include at least one of a transition metal, a metal in Groups 1, 12, 13, 14, 15 and 16 of the periodic table of the elements, and compounds of the above-listed metals.

In one embodiment, for example, the first inorganic protective layer 11 and the second inorganic protective layer 14 may each independently include at least one of lithium, magnesium, calcium, strontium, barium, yttrium, lanthanum, titanium, zirconium, hafnium, vanadium, niobium, tantalum, chromium, molybdenum, tungsten, cerium, praseodymium, neodymium, samarium, gadolinium, and yttrium; and oxides, hydroxides, bromides, chlorides, fluorides, sulfides, nitrates, carbonates, sulfates, phosphates, oxalates, and acetates of the above-listed metals. In another embodiment, the first inorganic protective layer 11 and the second inorganic protective layer 14 may each independently include at least one of lithium, calcium, magnesium, yttrium, lanthanum, titanium, zirconium, vanadium, niobium, chromium, cerium, samarium, and oxides, hydroxides, and carbonates of the above-listed metals. In another embodiment, the first inorganic protective layer 11 and the second inorganic protective layer 14 may each independently include ionic liquids of the above-listed metals.

In an embodiment, the first inorganic protective layer 11 and the second inorganic protective layer 14 may each have a thickness in a range from about 1 nanometer (nm) to about 1000 micrometers (μm). In an embodiment, the first inorganic protective layer 11 and the second inorganic protective layer 14 may each have a thickness in a range from about 10 nm to about 100 μm. In such embodiment, the first inorganic protective layer 11 and the second inorganic protective layer 14 may be effectively ductile and effectively protect the inorganic-organic composite electrolyte layer.

In an embodiment, the inorganic-organic composite electrolyte layer may have a composite structure including the inorganic electrolyte 12 and the organic electrolyte 13. The inorganic electrolyte 12 may function as a support member of the inorganic-organic composite electrolyte layer such that stability of the inorganic-organic composite electrolyte layer, which depends on the content of the inorganic electrolyte 12, is substantially improved. The organic electrolyte 13 may contribute to the ductility of the inorganic-organic composite electrolyte layer, and increase an area thereof. In such an embodiment, the organic electrolyte 13 may compensate defects, such as pin holes and cracks, caused by the organic electrolyte 13, such that interfacial adhesion is substantially improved.

In an embodiment, a weight ratio of the inorganic electrolyte 12 with respect to the organic electrolyte 13 in the inorganic-organic composite electrolyte layer may be in a range of, for example, from about 80:20 to about 20:80.

In an embodiment, the inorganic-organic composite electrolyte layer may have a thickness in a range from about 10 nm to about 1,000 μm. In such an embodiment, where the inorganic-organic composite electrolyte layer may have a thickness in a range from about 10 nm to about 1,000 μm, the inorganic-organic composite electrolyte layer may be ductile and have a sufficiently high ionic conductivity.

In an embodiment, the inorganic electrolyte 12 of the inorganic-organic composite electrolyte layer may include at least one of a transition metal and metals in Groups 1, 12, 13, 14, 15, and 16 of the periodic table of the elements, and a compound of the above-listed metals. In one embodiment, for example, the inorganic electrolyte 12 may include at least one selected from lithium, magnesium, calcium, strontium, barium, yttrium, lanthanum, titanium, zirconium, hafnium, vanadium, niobium, tantalum, chromium, molybdenum, tungsten, cerium, praseodymium, neodymium, samarium, gadolinium and yttrium. In such an embodiment, the inorganic electrolyte 12 may include at least one compound of the above-listed metals, including oxides, hydroxides, bromides, chlorides, fluorides, sulfides, nitrates, carbonates, sulfates, phosphates, oxalates, and acetates of the above-listed metals.

In one embodiment, for example, the inorganic electrolyte 12 may be at least one of lithium, calcium, magnesium, strontium, yttrium, lanthanum, titanium, zirconium, vanadium, niobium, chromium, cerium, samarium, and oxides, hydroxides, and carbonates of the above-listed metals.

In one embodiment, for example, the organic electrolyte 13 of the inorganic-organic composite electrolyte layer may include a lithium conductive polymer and/or an ionic liquid. In such an embodiment, the organic electrolyte 13 may include an ionic liquid in solid phase.

In such an embodiment, the lithium conductive polymer may include a polymer with a lithium salt, e.g., a blend or complex of the polymer and the lithium salt. In one embodiment, for example, the polymer of the lithium conductive polymer may be polyethylene oxide ("PEO"), polymethylmethacrylate ("PMMA"), polypropylene oxide, polyvinylidene fluoride ("PVDF"), polystyrene, polyvinyl chloride ("PVC"), polyvinyl alcohol ("PVA"), polyacrylonitrile ("PAN"), polyester sulfide, derivatives of the above-listed polymers, and a polymer with an ionic dissociable group. The polymer for the lithium conductive polymer may include at least one of these polymers.

In such an embodiment, the lithium salt of the lithium conductive polymer may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are not the same, and may each independently be an integer of 1 to 20), LiCl, LiI, or a combination thereof, but not being limited thereto. In such an embodiment, an amount of the lithium salt is not specifically limited. In one embodiment, for example, the amount of the lithium salt may be in a range from about 0.1 mole to about 1 mole with respect to 1 mole of the polymer.

In an embodiment, the organic electrolyte 13 and the inorganic electrolyte 12 in the inorganic-organic composite electrolyte layer may have a core-shell structure. In such an embodiment, one of the organic electrolyte 13 and the inorganic electrolyte 12 defines a core of the core-shell structure, and the other of the organic electrolyte 13 and the inorganic electrolyte 12 defines a shell of the core-shell structure. In one embodiment, for example, the inorganic electrolyte 12 may define a core of the core-shell structure, and the organic electrolyte 13 may define a shell of the core-shell structure. In such an embodiment, where the inorganic-organic composite electrolyte layer has a core-shell structure, the inorganic-organic composite electrolyte layer may have a substantially dense structure, and thus interfacial resistance therein may be substantially lowered.

The inorganic-organic composite electrolyte layer may further include a common solid ionic conductor, for example, a common sulfide-based conductor and/or an oxide-based conductor. In one embodiment, for example, the common solid ionic conductor may be at least one of $Li_3N$, lithium super ionic conductor ("LISICON"), lithium phosphorous oxynitride ("LIPON": Li3-yPO4-xNx, $0<y<3$, $0<x<4$), thio-LISICON ($Li_{3.25}Ge_{0.25}P_{0.75}S_4$), $Li_2S$, $Li_2S$—

$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ ("LATP"), but not being limited thereto. In such embodiments, any of various solid ionic conductors may be included in the inorganic-organic composite electrolyte layer.

According to another embodiment, a method of preparing a flexible solid electrolyte includes: spraying a first inorganic protective layer forming material on an electrode (e.g., a cathode) to provide, e.g., to form, a first inorganic protective layer; spraying an inorganic-organic composite electrolyte layer forming material on the first inorganic protective layer to provide an inorganic-organic composite electrolyte layer; and spraying a second inorganic protective layer forming material on the inorganic-organic composite electrolyte layer to provide a second inorganic protective layer.

In such an embodiment, the flexible solid electrolyte including the inorganic-organic composite electrolyte layer and the first and second inorganic protective layers may be provided using a spraying process, for example, room-temperature spraying, such as aerosol deposition, thereby suppressing volatilization of lithium, which may occur in high-temperature sintering, and fragility of oxides, such that the flexible solid electrolyte prepared thereby has improved flexibility and a large area. In such an embodiment, reduction on an interfacial resistance between the electrodes and the electrolyte membrane or an interfacial resistance in the electrolyte membrane, which may occur during the high-temperature spraying process, may be effectively prevented.

As used herein, the term "room temperature" is defined as an absolute temperature in a range from about 280 Kelvins (K) to about 320 Kelvins (K).

In an embodiment, where the flexible solid electrolyte including the inorganic-organic composite electrolyte layer and the first and second inorganic protective layers is provided using the aerosol deposition, the aerosol deposition may include spraying powder of each component (e.g., inorganic-organic composite electrolyte layer forming material) against a target (e.g., the first inorganic protective layer) at a high speed of from about 300 meters per second (m/s) to about 500 m/s for about 1 second to about 100 seconds to form an intended thin film (e.g., the flexible solid electrolyte).

Hereinafter, an embodiment of providing a flexible solid electrolyte using aerosol deposition will be described in greater detail.

In an embodiment, to provide the first and second inorganic protective layers, inorganic powder having a composition of the first and second inorganic protective layers of an embodiment of the flexible solid electrolyte described above (e.g., at least one of a transition metal, a metal in Groups 1, 12, 13, 14, 15 and 16 of the periodic table of the elements, and compounds of the above-listed metal) may be prepared. In such an embodiment, the inorganic powder may have an average particle diameter in a range of, for example, from about 1 μm to about 10 μm. After synthesizing lithium conductive polymer powder as an organic electrolyte, the organic electrolyte may be mixed with the inorganic powder at a predetermined weight ratio to prepare mixed powder for forming an inorganic-organic composite electrolyte layer. In an alternative embodiment, the mixed powder for forming the inorganic-organic composite electrolyte layer may be further mixed with a solid ionic conductor powder. The lithium conductive powder may have an average particle diameter in a range of, for example, from about 1 μm to about 10 μm.

In such an embodiment, the inorganic powder may be sprayed on an electrode (e.g., a cathode) using an aerosol deposition apparatus to form the first inorganic protective layer. Subsequently, the mixed powder may be sprayed on the first inorganic protective layer to form the inorganic-organic composite electrolyte layer. Afterward, the inorganic powder may be sprayed on the inorganic-organic composite electrolyte layer to form the second inorganic protective layer, thereby completing the preparation of the flexible solid electrolyte.

An embodiment of an all-solid-state lithium battery may be manufactured using an embodiment of the flexible solid electrolyte described above.

According to another embodiment, an all-solid-state lithium battery includes a plurality of flexible solid electrolytes.

In such an embodiment, the all-solid-state lithium battery includes an embodiment of the flexible solid electrolyte with improved ionic conductivity and improved flexibility characteristics, such that the all-solid-state lithium battery may have improved ionic conductivity and improved flexibility characteristics, and thus, electrochemical stability and energy efficiency of the all-solid-state lithium battery may be increased.

According to an embodiment, the all-solid-state lithium battery may include a cathode, an anode, and an embodiment of the flexible solid electrolyte described above, which is disposed between the cathode and the anode. In another embodiment, the all-solid-state lithium battery may further include polymer electrolyte membranes disposed respectively between the cathode and the solid electrolyte and between the anode and the solid electrolyte.

In such an embodiment, where the all-solid-state lithium battery includes the polymer electrolyte membranes, adhesion between the solid electrolyte and the cathode and/or anode may be improved, thereby improving battery characteristics. In an embodiment, the polymer electrolyte membranes may be impregnated with an organic electrolyte solution including a lithium salt and an organic solvent.

Hereinafter, an embodiment of a method of manufacturing the all-solid-state lithium battery will be described in greater detail.

First, a cathode is prepared.

In an embodiment, the cathode may be prepared by providing, e.g., forming, a cathode active material layer including a cathode active material on a current collector. In such an embodiment, the cathode active material layer may be formed by a vapor phase method or a solid phase method. In an embodiment, where the cathode active material layer may be formed by the vapor phase method, the vapor phase method may be pulse laser deposition ("PLD"), sputtering deposition, chemical vapor deposition ("CVD") or aerosol deposition, for example, but not being limited thereto. In such an embodiment, any of various vapor phase methods available in the art may be used. In an embodiment where the cathode active material layer may be formed by the solid phase method, the solid phase method may be sintering, a sol-gel method, a doctor blade method, screen printing, slurry casting or powder compression, for example, but not being limited thereto. In such an embodiment, any of various solid phase methods available in the art may be used.

The cathode active material may be any common cathode active material available in the art, for example, a lithium transition metal oxide, a transition metal oxide, or the like. The common cathode active material may be at least one of a composite oxide of lithium with a metal, which include at least one selected from Co, Mn, Ni and a combination thereof. In one embodiment, for example, the common cathode active material may be at least one composite oxide of lithium with a metal, which includes at least one selected from cobalt, manganese, nickel, and combinations thereof. In one embodiment, for example, the common cathode active material may be a compound represented by one of the following formulae: $Li_aA_{1-b}B_bD_2$ (where $0.90\le a\le 1.8$, and $0\le b\le 0.5$); $Li_aE_{1-b}B_bO_{2-c}D_c$ (where $0.90\le a\le 1.8$, $0\le b\le 0.5$, and $0\le c\le 0.05$); $LiE_{2-b}B_bO_{4-c}D_c$ (where $0\le b\le 0.5$, and $0\le c\le 0.05$); $Li_aNi_{1-b-c}Co_bB_cD_\alpha$ (where $0.90\le a\le 1.8$, $0\le b\le 0.5$, $0\le c\le 0.05$, and $0<\alpha\le 2$); $Li_aNi_{1-b-c}Co_bB_cO_{2-\alpha}F_\alpha$ (where $0.90\le a\le 1.8$, $0\le b\le 0.5$, $0\le c\le 0.05$, and $0<\alpha<2$); $Li_aNi_{1-b-c}Co_bB_cO_{2-\alpha}F_2$ (where $0.90\le a\le 1.8$, $0\le b\le 0.5$, $0\le c\le 0.05$, and $0<\alpha<2$); $Li_aNi_{1-b-c}Mn_bB_cD_\alpha$ (where $0.90\le a\le 1.8$, $0\le b\le 0.5$, $0\le c\le 0.05$, and $0<\alpha\le 2$); $Li_aNi_{1-b-c}Mn_bB_cO_{2-\alpha}F_\alpha$ (where $0.90\le a\le 1.8$, $0\le b\le 0.5$, $0\le c\le 0.05$, and $0<\alpha<20$; $Li_aNi_{1-b-c}Mn_bB_cO_{2-\alpha}F_2$ (where $0.90\le a\le 1.8$, $0\le b\le 0.5$, $0\le c\le 0.05$, and $0<\alpha<2$); $Li_aNi_bE_cG_dO_2$ (where $0.90\le a\le 1.8$, $0\le b\le 0.9$, $0\le c\le 0.5$, and $0.001\le d\le 0.1$); $Li_aNi_bCo_cMn_dGeO_2$ (where $0.90\le a\le 1.8$, $0\le b\le 0.9$, $0\le c\le 0.5$, $0\le d\le 0.5$, and $0.001\le e\le 0.1$); $Li_aNiG_bO_2$ (where $0.90\le a\le 1.8$, and $0.001\le b\le 0.1$); $Li_aCoG_bO_2$ (where $0.90\le a\le 1.8$, and $0.001\le b\le 0.1$); $Li_aMnG_bO_2$ (where $0.90\le a\le 1.8$, and $0.001\le b\le 0.1$); $Li_aMn_2G_bO_4$ (where $0.90\le a\le 1.8$, and $0.001\le b\le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3(0\le f\le 2)$; $Li_{(3-f)}Fe_2(PO_4)_3(0\le f\le 2)$; and $LiFePO_4$.

In the formulae above, A is selected from nickel (Ni), cobalt (Co), manganese (Mn), and combinations thereof; B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

In another embodiment, the common cathode active material may be $LiCoO_2$, $LiMn_xO_{2x}$ (x=1, 2), $LiNi_{1-x}Mn_xO_{2x}$ ($0<x<1$), $Ni_{1-x-y}Co_xMn_yO_2$ ($0\le x\le 0.5$, $0\le y\le 0.5$), $LiFePO_4$, $TiS_2$, $FeS_2$, $TiS_3$, or $FeS_3$.

The cathode active material layer may further include such a solid ionic conductor as described above (e.g., a common sulfide-based conductor and/or an oxide-based conductor), in addition to the cathode active material. In an embodiment, where the cathode active material layer further includes the solid ionic conductor, an interfacial resistance between the cathode and a solid electrolyte layer are substantially reduced, ionic conductivity in the cathode active material layer are substantially improved, and thermal stability of the cathode is substantially improved.

In an embodiment, the cathode active material layer may further include, for example, a conducting agent, a binder, or the like. In such an embodiment, the conducting agent and the binder may be any material available in the art for such use.

After the preparation of the cathode, a flexible solid electrolyte may be prepared using a spraying process as described above.

Next, an anode is prepared.

The anode may be prepared in the same manner as used in the preparation of the cathode, except that an anode active material, instead of the cathode active material, is used. In an embodiment, the anode may further include the solid ionic conductor described above in an anode active material layer.

In an embodiment, the anode active material is not limited to a specific material, and may be any common anode active material used in the art. In one embodiment, for example, the anode active material may include at least one selected from the group consisting of a lithium metal, a metal alloyable with lithium, a transition metal oxide, a non-transition metal oxide, and a carbonaceous material.

In an embodiment, where the anode active material may include the metal alloyable with lithium, the metal alloyable with lithium may be Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn), for example. Here, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

In such an embodiment, the transition metal oxide may be a lithium titanium oxide, a vanadium oxide, and a lithium vanadium oxide, for example.

In such an embodiment, the non-transition metal oxide are $SnO_2$ and $SiO_x$ ($0<x<2$), for example.

In such an embodiment, the carbonaceous material may be crystalline carbon, amorphous carbon, and combinations thereof, for example. In such an embodiment, the crystalline carbon may be graphite, such as natural graphite or artificial graphite that are in amorphous, plate, flake, spherical or fibrous form, for example. In such an embodiment, the amorphous carbon may include soft carbon (carbon sintered at low temperatures), hard carbon, meso-phase pitch carbides, sintered corks, and the like, for example.

Figure 3:
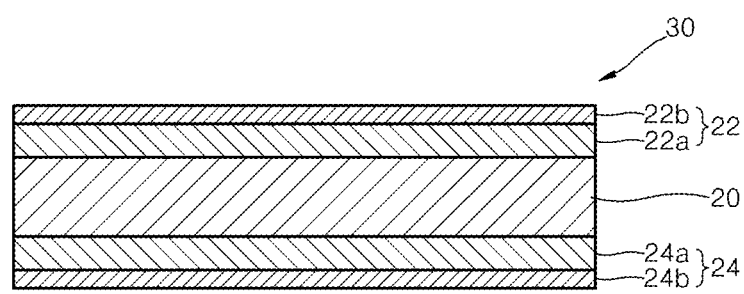
FIG. 3 is a schematic view of an embodiment of an all-solid-state lithium battery.

FIG. 3 is a schematic view of an embodiment of an all-solid-state lithium battery 30. Referring to FIG. 3, an embodiment of the all-solid-state lithium battery 30 includes a flexible solid electrolyte membrane 20, and a cathode 22 and an anode 24, which are disposed on opposite surfaces of the flexible solid electrolyte membrane 20, respectively. The cathode 22 includes a cathode active material layer 22a contacting (e.g., directly disposed on) the flexible solid electrolyte membrane 20, and a cathode current collector 22b contacting the cathode active material layer 22a. The anode 24 includes an anode active material layer 24a contacting the flexible solid electrolyte membrane 20, and an anode current collector 24b contacting the anode active material layer 24a. Such an embodiment of the all-solid-state lithium battery 30 may be manufactured using a solid phase method, a vapor phase method, or a combination of these two methods. In one embodiment, for example, after providing, e.g., forming, the cathode active material layer 22a and the anode active material layer 24a on the opposite surfaces of the flexible solid electrolyte membrane 20 using a vapor phase method, a solid phase method, or a combination thereof, the cathode current collector 22b and the anode current collector 24b may be provided, e.g., formed, on the cathode active material layer 22a and the anode active material layer 24a, respectively, thereby manufacturing the all-solid-state lithium battery 30. In an alternative embodiment, the anode active material layer 24a, the flexible solid electrolyte membrane 20, the cathode active material layer 22a, and the cathode current collector 22b may be sequentially deposited on the anode current collector 24b, thereby manufacturing the all-solid-state lithium battery 30.

In an embodiment, the all-solid-state lithium battery 30 may be manufactured by sequentially depositing the anode active material layer 24a, the flexible solid electrolyte membrane 20, the cathode active material layer 22a and the cathode current collector 22b on the anode current collector 24b using aerosol deposition.

In another embodiment of the invention, a battery pack may include a plurality of battery assemblies, each including the all-solid-state lithium battery, which may be stacked therein. Such an embodiment of the battery pack may be used in a device that operates at high temperatures and requires high output, for example, in a laptop computer, a smart phone, an electric vehicle, and the like.

The battery pack may have high thermal stability and improved high-rate characteristics, and thus may be applicable in electric vehicles ("EV"s), for example, in a hybrid vehicle such as a plug-in hybrid electric vehicle ("PHEV"), or in an electricity storage system ("ESS") for storing a large quantity of electricity.

Due to having flexible characteristics, an embodiment of the all-solid-state lithium battery including the flexible solid electrolyte may have a roll-like shape, but not being limited thereto. In an alternative embodiment, the all-solid-state lithium battery including the flexible solid electrolyte may have any of various structures.

Hereinafter, embodiments of the invention will be described in detail with reference to the following example. However, the scope of embodiments of the invention is not limited to the example.

Preparation of all-Solid-State Lithium Battery: Example

PEO having a weight average molecular weight of about 600,000 was blended with about 0.3 mole of $LiCF_3SO_3$ as a lithium salt to synthesize lithium conductive polymer powder having an average particle diameter in a range from about 1 μm to about 10 μm.

$Li_7La_3Zr_2O_{12}$ was synthesized using a solid phase method, and was then calcined at about 120° C. to prepare Li—La—Zr-based inorganic electrolyte powder having an average particle diameter in a range of about 1 nm to about 10 μm.

The lithium conductive polymer powder and the Li—La—Zr-based inorganic electrolyte powder were uniformly mixed using milling to obtain mixed powder.

$Li_4Ti_5O_{12}$-carbon powder as an anode active material was sprayed onto a Cu foil as an anode current collector using an aerosol deposition apparatus at a high speed of about 300 m/sec for about 120 seconds to form an anode active material layer.

The Li—La—Zr-based inorganic electrolyte powder was sprayed onto the anode active material layer by using the aerosol deposition apparatus at a high speed of about 300 m/s for about 10 seconds to form a first inorganic protective layer having a thickness of about 0.1 μm.

The mixed powder was sprayed onto the first inorganic protective layer using the aerosol deposition apparatus at a high speed of about 300 m/s for about 120 seconds to form an inorganic-organic composite electrolyte layer having a thickness of about 1 μm.

The Li—La—Zr-based inorganic electrolyte powder was sprayed onto the inorganic-organic composite electrolyte layer using the aerosol deposition apparatus at a high speed of about 300 m/s for about 10 seconds to form a second inorganic protective layer having a thickness of about 0.1 μm.

$LiFePO_4$-carbon powder as a cathode active material was sprayed onto the second inorganic protective layer using the aerosol deposition apparatus at a high speed of about 300 m/s for about 120 seconds to form a cathode active material layer.

Figure 4:
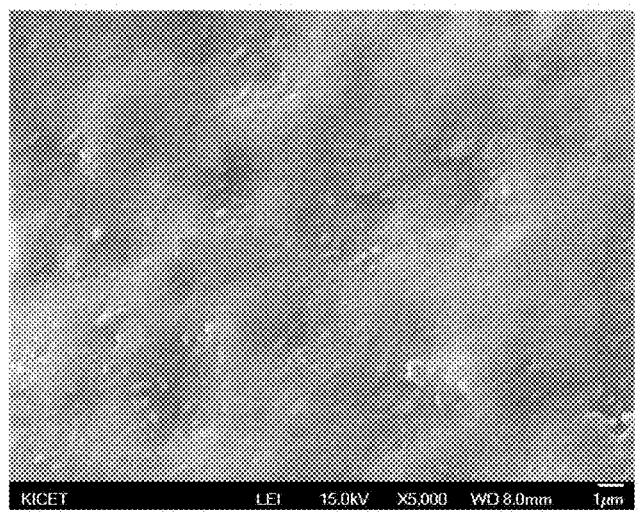
FIG. 4 is a scanning electron microscopic ("SEM") image showing a surface structure of thin layers formed using aerosol deposition provided as an Example of a solid electrolyte membrane.

A scanning electron microscopic ("SEM") image of a surface structure of thin films formed through the aerosol deposition processes as described above is shown in FIG. 4. Referring to FIG. 4, the thin films formed through the aerosol deposition processes provides a dense solid electrolyte membrane, e.g., may have a density in a range of about 0.3 gram per cubic centimeter ($g/cm^3$) to about 1.0 $g/cm^3$. In one embodiment, the first inorganic protective layer has a density in a range of, for example, about 0.3 $g/cm^3$ to about 1.0 $g/cm^3$, the second inorganic protective layer has a density in a range of, for example, about 0.3 $g/cm^3$ to about 1.0 $g/cm^3$, and the inorganic-organic composite electrolyte layer has a density in a range of, for example, about 0.5 $g/cm^3$ to about 1.0 $g/cm^3$.

Evaluation of the Example: Ionic Conductivity Measurement

Figure 5:
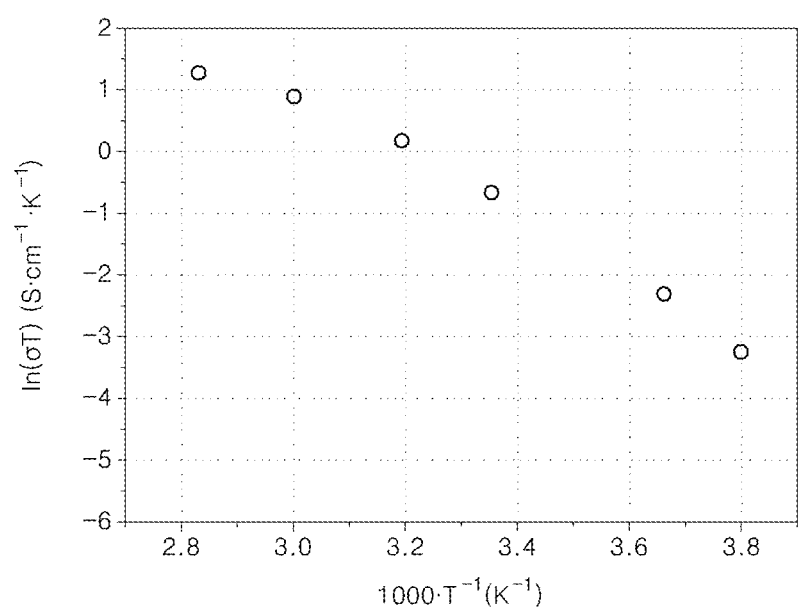
FIG. 5 is a graph illustrating results of ionic conductivity measurement of the solid electrolyte membrane of the Example shown in FIG. 4.

To measure ionic conductivity of the solid electrolyte membrane prepared in above Example, the resistance of the solid electrolyte membrane was measured by impedance spectroscopy using a Solartron 1260 frequency response analyzer and a Solartron 1287 electrochemical interface (from Solartron Analytical) at a frequency range of from about 1 hertz (Hz) to about 1 megahertz (MHz). Afterward, area specific resistance was calculated from impedance data obtained by the resistance measurement of the solid electrolyte membrane prepare as the Example described above, and was used to calculate ionic conductivity of the solid electrolyte membrane. The results of the ionic conductivity measurement are shown in FIG. 5.

As described above, according to an embodiment of the invention, a flexible solid electrolyte including an inorganic-organic composite electrolyte layer, which is protected by inorganic protective layers, may have high electrochemical stability, high ionic conductivity, and flexible characteristics. An embodiment of an all-solid-state lithium battery including the flexible solid electrolyte may have improved physical and electrical characteristics. According to an embodiment of a method of preparing a flexible solid electrolyte, the flexible solid electrolyte may be manufactured at room temperature by spraying, and the prepared flexible solid electrolyte may have a reduced interfacial resistance with respect to an electrode of the all-solid-state lithium battery.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A method of preparing a flexible solid electrolyte, the method comprising:
spraying a first inorganic protective layer forming material on a cathode to form a first inorganic protective layer;
spraying an inorganic-organic composite electrolyte layer forming material on the first inorganic protective layer to form an inorganic-organic composite electrolyte layer, wherein the inorganic-organic composite electrolyte layer forming material comprises an inorganic component and an organic component, and wherein the inorganic component and the organic component collectively form a continuous ion conducting path in the inorganic-organic composite electrolyte layer; and
spraying a second inorganic protective layer forming material on the inorganic-organic composite electrolyte layer to form a second inorganic protective layer.

2. The method of claim 1, wherein at least one of the spraying the first inorganic protective layer forming material, the spraying the inorganic-organic composite electrolyte layer forming material and the spraying the second inorganic protective layer forming material comprises using an aerosol deposition process.

3. The method of claim 1, wherein each of the first inorganic protective layer forming material and the second inorganic protective layer forming material comprises at least one of lithium, magnesium, calcium, strontium, barium, yttrium, lanthanum, titanium, zirconium, hafnium, vanadium, niobium, tantalum, chromium, molybdenum, tungsten, cerium, praseodymium, neodymium, samarium, gadolinium, and yttrium; oxides, hydroxides, bromides, chlorides, fluorides, sulfides, nitrates, carbonates, sulfates, phosphates, oxalates, acetates thereof, and ionic liquids thereof.

4. The method of claim 1, wherein each of the first inorganic protective layer and the second inorganic protective layer has a thickness in a range of about 1 nanometer to about 100 micrometers.

5. The method of claim 1, wherein the inorganic-organic composite electrolyte layer forming material comprises an inorganic electrolyte, an organic electrolyte or an ionic liquid.

6. The method of claim 5, wherein a weight ratio of the inorganic electrolyte with respect to the organic electrolyte is in a range of about 80:20 to about 20:80.

7. The method of claim 1, wherein the inorganic-organic composite electrolyte layer has a thickness in a range of about 10 nanometers to about 1,000 micrometer.

8. The method of claim 5, wherein the organic electrolyte comprises a polymer and a lithium salt.

9. The method of claim 8, wherein the polymer comprises at least one of polyethylene oxide (PEO), polymethylmethacrylate (PMMA), polypropylene oxide, polyvinylidene fluoride (PVDF), polystyrene, polyvinyl chloride (PVC), polyvinyl alcohol (PVA), polyacrylonitrile (PVN), and polyester sulfide, derivatives thereof, and a polymer with an ionic-dissociable group.

10. The method of claim 1, wherein the inorganic component and the organic component of the inorganic-organic composite electrolyte layer forming material has a core-shell structure, one of the inorganic component and the organic component of the inorganic-organic composite electrolyte layer forming material defines a core of the core-shell structure, and the other of the inorganic component and the organic component of the inorganic-organic composite electrolyte layer forming material defines a shell of the core-shell structure.

11. The method of claim 1, wherein the first inorganic protective layer, the second inorganic protective layer or the inorganic-organic composite electrolyte layer is provided using aerosol deposition such that the first inorganic protective layer, the second inorganic protective layer or the inorganic-organic composite electrolyte layer has a density in a range of about 0.3 gram per cubic centimeter to about 1.0 gram per cubic centimeter.

* * * * *